US012779334B2

(12) United States Patent
Zang et al.

(10) Patent No.: US 12,779,334 B2
(45) Date of Patent: Nov. 3, 2026

(54) VIRTUAL OBJECT CONTROL METHOD AND APPARATUS, COMPUTER DEVICE AND STORAGE MEDIUM

(71) Applicant: Beijing Zitiao Network Technology Co., Ltd., Beijing (CN)

(72) Inventors: Xin Zang, Beijing (CN); Kuo Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 327 days.

(21) Appl. No.: 18/394,649

(22) Filed: Dec. 22, 2023

(65) Prior Publication Data

US 2024/0226744 A1 Jul. 11, 2024

(30) Foreign Application Priority Data

Jan. 5, 2023 (CN) ......................... 202310014269.4

(51) Int. Cl.
*A63F 13/56* (2014.01)
*A63F 13/5258* (2014.01)

(52) U.S. Cl.
CPC .......... *A63F 13/56* (2014.09); *A63F 13/5258* (2014.09)

(58) Field of Classification Search
CPC ............................ A63F 13/56; A63F 13/5258
See application file for complete search history.

(56) References Cited

U.S. PATENT DOCUMENTS 6,165,073 A * 12/2000 Miyamoto .............. A63F 13/10 463/31
8,277,316 B2 * 10/2012 Haigh-Hutchinson ..................... A63F 13/5258 463/31

(Continued)

FOREIGN PATENT DOCUMENTS

CN 106293070 A 1/2017
CN 110743168 A 2/2020

(Continued)

OTHER PUBLICATIONS

Office action received from Chinese patent application No. 202310014269.4 mailed on Dec. 31, 2025, 16 pages (8 pages English Translation and 8 pages Original Copy).

*Primary Examiner* — Chase E Leichliter

(57) ABSTRACT

The present disclosure provides a virtual object control method and apparatus, a computer device and a storage medium, wherein the method comprises: displaying a virtual scene and a first virtual object controlled by a current client in a display interface of a terminal device; wherein a first pose of the first virtual object in the virtual scene is linked with a second pose of a virtual camera in the virtual scene; responding to a target trigger operation, and determining a target virtual object which satisfies a preset interactive condition in the virtual scene based on the first pose of the first virtual object; and, suspending the linkage relationship between a first orientation of the first pose and a second orientation of the second pose; determining movement information of the first virtual object based on a third pose of the target virtual object and the first pose; and controlling the first virtual object to make a movement according to the movement information, and controlling the first virtual object to perform an interactive action corresponding to the (Continued)

target trigger operation on the target virtual object after the movement is finished.

20 Claims, 3 Drawing Sheets

(56) References Cited

U.S. PATENT DOCUMENTS 10,786,733 B2* 9/2020 Tang .................... A63F 13/2145
12,053,696 B2* 8/2024 Wan ....................... G06F 3/0484
2002/0103031 A1* 8/2002 Neveu .................... A63F 13/537 463/49
2006/0111182 A1* 5/2006 Nakanishi ............. A63F 13/426 463/36
2006/0252531 A1* 11/2006 Kando .................. A63F 13/335 463/36
2006/0258443 A1* 11/2006 Moro .................. A63F 13/2145 463/30
2007/0270215 A1* 11/2007 Miyamoto .............. A63F 13/45 463/32
2008/0026843 A1* 1/2008 Nakasaka ........... A63F 13/2145 463/37
2008/0227543 A1* 9/2008 Kawase .................. A63F 13/10 463/31
2010/0004041 A1* 1/2010 Shindo .................... A63F 13/42 463/36
2010/0240429 A1* 9/2010 Chosogabe ............. A63F 13/56 463/43
2010/0267435 A1* 10/2010 Taya ....................... A63F 13/45 463/2
2010/0267436 A1* 10/2010 Lee ....................... A63F 13/833 463/8
2010/0273544 A1* 10/2010 Koganezawa ...... A63F 13/5375 463/2
2011/0039618 A1* 2/2011 Ichiyanagi ............ A63F 13/837 463/31
2012/0178531 A1* 7/2012 Yamada ................ A63F 13/537 463/33
2012/0327106 A1* 12/2012 Won ...................... A63F 13/843 345/173
2013/0288790 A1* 10/2013 Wang .................. A63F 13/2145 463/31
2013/0316813 A1* 11/2013 Derome .............. A63F 13/2145 463/31
2013/0316817 A1* 11/2013 Tanzawa ............... G06F 3/0481 463/31
2014/0121012 A1* 5/2014 Tagawa ................... A63F 13/00 463/31
2015/0157932 A1* 6/2015 Kwon .................... G06Q 50/00 463/31
2015/0273343 A1* 10/2015 Watabe ................... A63F 13/00 463/31
2016/0124518 A1* 5/2016 Takahashi ........... G06F 3/04817 463/31
2016/0129345 A1* 5/2016 Seok ..................... A63F 13/213 463/31
2016/0199728 A1* 7/2016 Yoon ..................... G06F 3/0488 463/37
2016/0263481 A1* 9/2016 Yamagami ............ A63F 13/537
2017/0072311 A1* 3/2017 Maejima ................. A63F 13/42
2017/0340959 A1* 11/2017 Tang ..................... G06F 3/0488
2017/0368462 A1* 12/2017 Jo ........................... A63F 13/35
2018/0024660 A1* 1/2018 Wang .................. G06F 3/04817 273/110
2018/0028914 A1* 2/2018 Yamaguchi ............. A63F 13/92
2018/0147488 A1* 5/2018 Tang ................... A63F 13/2145
2018/0185747 A1* 7/2018 Li ........................... A63F 13/58
2018/0200616 A1* 7/2018 Li ......................... A63F 13/214
2020/0356240 A1 11/2020 Paul et al.
2021/0275914 A1* 9/2021 Wu ........................ A63F 13/577
2021/0299562 A1* 9/2021 Zhou ................... A63F 13/5378
2021/0402298 A1* 12/2021 Zhou ................... A63F 13/5255
2022/0035515 A1* 2/2022 Wan ..................... A63F 13/5372
2022/0040578 A1* 2/2022 Hu ........................ A63F 13/426
2022/0198768 A1 6/2022 Tezaur
2022/0258056 A1* 8/2022 Jiang ..................... A63F 13/426
2022/0297005 A1* 9/2022 Kamiya .................. A63F 13/44
2022/0362673 A1* 11/2022 Wei ....................... A63F 13/426
2023/0330532 A1* 10/2023 Fan ..................... A63F 13/5372
2023/0356080 A1* 11/2023 Zheng ..................... A63F 13/58
2024/0143145 A1* 5/2024 Wan .................... A63F 13/5372
2024/0198212 A1* 6/2024 Li ......................... A63F 13/837
2024/0226744 A1* 7/2024 Zang ................... A63F 13/5258

FOREIGN PATENT DOCUMENTS

CN 111672118 A 9/2020
CN 112402969 A 2/2021
CN 113785264 A 12/2021
JP 2010-233821 A 10/2010
JP 2019-128947 A 8/2019

* cited by examiner

VIRTUAL OBJECT CONTROL METHOD AND APPARATUS, COMPUTER DEVICE AND STORAGE MEDIUM

CROSS-REFERENCE TO RELATED APPLICATIONS

The present application is based on and claims priority of CN Application No. 202310014269.4, filed on Jan. 5, 2023, the disclosure of which is incorporated by reference herein in its entirety.

TECHNICAL FIELD

The present disclosure relates to the technical field of computer technology, and in particular, to a virtual object control method and apparatus, a computer device and a storage medium.

BACKGROUND

At present, application programs such as games and social networking software can enable a user to control a certain virtual object to interact with other virtual objects, for example, to control the virtual object to attack other virtual objects with a sword, and when the virtual object performs an interactive action, the interactive action usually has a certain interaction range, if other virtual objects are not in the interaction range, the user cannot successfully interact with other virtual objects.

SUMMARY

Embodiments of the present disclosure at least provide a virtual object control method and apparatus, a computer device and a storage medium.

In a first aspect, the embodiments of the present disclosure provide a virtual object control method, comprising:

displaying a virtual scene and a first virtual object controlled by a current client in a display interface of a terminal device; wherein a first pose of the first virtual object in the virtual scene is linked with a second pose of a virtual camera in the virtual scene;

responding to a target trigger operation, and determining a target virtual object which satisfies a preset interactive condition in the virtual scene based on the first pose of the first virtual object; and, suspending the linkage relationship between a first orientation of the first pose and a second orientation of the second pose;

determining movement information of the first virtual object based on a third pose of the target virtual object and the first pose; and controlling the first virtual object to make a movement according to the movement information and controlling the first virtual object to perform an interactive action corresponding to the target trigger operation on the target virtual object after the movement is finished.

In a possible implementation, the first pose further comprises a first position, and the second pose further comprises a second position;

the determining a target virtual object which satisfies a preset interactive condition in the virtual scene based on the first pose of the first virtual object comprises:

determining, from a plurality of second virtual objects included in the virtual scene, candidate virtual objects located within a first distance range from the first position of the first virtual object;

determining a target angle between a third orientation of each candidate virtual object relative to the virtual camera and the second orientation; and determining the target virtual object from the candidate virtual objects based on the target angle.

In a possible implementation, the responding to a target trigger operation comprises:

responding to a target trigger operation on a target prop of the first virtual object;

the determining movement information of the first virtual object based on the third pose of the target virtual object and the first pose comprises:

determining movement information of the first virtual object based on the third pose of the target virtual object, the first pose and the corresponding range of action of the target prop.

In a possible implementation, the movement information includes a movement distance and a steering angle, wherein the steering angle is an angle at which the first virtual object needs to be deflected toward the target virtual object, the third pose comprises a third position, and the first pose comprises a first position;

the determining movement information of the first virtual object based on the third pose of the target virtual object, the first pose and the corresponding range of action of the target prop comprises:

determining the movement direction based on the third position and the first position, and determining the steering angle based on the movement direction and the first orientation; and determining the movement distance based on the third position, the first position and the corresponding range of action of the target prop;

the controlling the first virtual object to make a movement according to the movement information comprises:

controlling the first virtual object to adjust the first orientation according to the steering angle and to make a movement according to the movement distance.

In a possible implementation, subsequent to controlling the first virtual object to perform an interactive action corresponding to the target trigger operation on the target virtual object, the method further comprises:

in the case where within a preset time period after the target trigger operation is responded it is not detected that a target trigger operation is performed again, or in the case where the state of the target virtual object satisfies a preset condition, reestablishing the linkage relationship between the first orientation and the second orientation.

In a possible implementation, subsequent to suspending the linkage relationship between a first orientation of the first pose and a second orientation of the second pose, the method further comprises:

responding to a movement control operation of the first virtual object, controlling the first virtual object to make a movement according to the movement control operation, and reestablishing the linkage relationship between the first orientation and the second orientation.

In a possible implementation, subsequent to reestablishing the linkage relationship between the first orientation and the second orientation, the method further comprises:

in the case where it is detected that the current first orientation of the first virtual object and the current second orientation of the virtual camera are inconsistent, adjusting the first orientation of the first virtual object, or adjusting the second orientation of the virtual camera.

In a second aspect, the embodiments of the present disclosure further provide a virtual object control apparatus, comprising:

a display module configured to display a virtual scene and a first virtual object controlled by a current client in a display interface of a terminal device; wherein a first pose of the first virtual object in the virtual scene is linked with a second pose of a virtual camera in the virtual scene;

a first determination module configured to determine a target virtual object which satisfies a preset interactive condition in the virtual scene based on the first pose of the first virtual object responding to a target trigger operation; and, suspend the linkage relationship between a first orientation of the first pose and a second orientation of the second pose;

a second determination module configured to determine movement information of the first virtual object based on a third pose of the target virtual object and the first pose; and a control module configured to control the first virtual object to make a movement according to the movement information and control the first virtual object to perform an interactive action corresponding to the target trigger operation on the target virtual object after the movement is finished.

In a possible implementation, the first pose further comprises a first position, and the second pose further comprises a second position;

the first determination module, when determining a target virtual object which satisfies a preset interactive condition in the virtual scene based on the first pose of the first virtual object, is configured to:

determine, from a plurality of second virtual objects included in the virtual scene, candidate virtual objects located within a first distance range from the first position of the first virtual object;

determine a target angle between a third orientation of each candidate virtual object relative to the virtual camera and the second orientation; and determine the target virtual object from the candidate virtual objects based on the target angle.

In a possible implementation, the first determination module, when responding to a target trigger operation, is configured to:

respond to a target trigger operation on a target prop of the first virtual object;

the second determination module, when determining movement information of the first virtual object based on a third pose of the target virtual object and the first pose, is configured to:

determine movement information of the first virtual object based on a third pose of the target virtual object, the first pose and the corresponding range of action of the target prop.

In a possible implementation, the movement information includes a movement distance and a steering angle, wherein the steering angle is an angle at which the first virtual object needs to be deflected toward the target virtual object, the third pose comprises a third position, and the first pose comprises a first position;

the second determination module, when determining movement information of the first virtual object based on a third pose of the target virtual object, the first pose and the corresponding range of action of the target prop, is configured to:

determine the movement direction based on the third position and the first position, and determine the steering angle based on the movement direction and the first orientation; and determine the movement distance based on the third position, the first position and the corresponding range of action of the target prop;

the control module, when controlling the first virtual object to make a movement according to the movement information, is configured to:

control the first virtual object to adjust the first orientation according to the steering angle and to make a movement according to the movement distance.

In a possible implementation, subsequent to controlling the first virtual object to perform an interactive action corresponding to the target trigger operation on the target virtual object, the apparatus is further configured to:

in the case where within a preset time period after the target trigger operation is responded it is not detected that a target trigger operation is performed again, or in the case where the state of the target virtual object satisfies a preset condition, reestablish the linkage relationship between the first orientation and the second orientation.

In a possible implementation, subsequent to suspending the linkage relationship between a first orientation of the first pose and a second orientation of the second pose, the apparatus is further configured to:

control the first virtual object to make a movement according to the movement control operation responding to a movement control operation of the first virtual object, and reestablish the linkage relationship between the first orientation and the second orientation.

In a possible implementation, subsequent to reestablishing the linkage relationship between the first orientation and the second orientation, the apparatus is further configured to:

in the case where it is detected that the current first orientation of the first virtual object and the current second orientation of the virtual camera are inconsistent, adjust the first orientation of the first virtual object, or adjust the second orientation of the virtual camera.

In a third aspect, the embodiments of the present disclosure further provide a computer device, which comprises a processor, a memory and a bus, wherein the memory stores machine-readable instructions executable by the processor, the processor and the memory communicate via the bus when the computer device runs, and when the machine-readable instructions are executed by the processor, the steps in the embodiments according to the above first aspect or any one of the possible implementations in the first aspect are implemented.

In a fourth aspect, the embodiments of the present disclosure further provide a computer-readable storage medium, wherein the computer-readable storage medium stores thereon a computer program, and when the computer program is executed by a processor, the steps in the embodiments according to the above first aspect or any one of possible implementations in the first aspect are implemented.

In order to make the above-mentioned objectives, features and advantages of the present disclosure more obvious and easier to understand, preferred embodiments are described in detail with reference to the accompanying drawings as follows.

BRIEF DESCRIPTION OF THE DRAWINGS

In order to illustrate the technical solutions of the embodiments of the present disclosure in a more clearly manner, the accompanying drawings necessary to be used in the embodiments will be briefly described below. The accompanying drawings herein are incorporated in and form a part of the description; they illustrate embodiments consistent with the present disclosure and, together with the description, serve to illustrate the technical solutions of the present disclosure. It is to be understood that the following drawings only depict some embodiments of the present disclosure and are therefore not to be construed as limiting the scope, and for those skilled in the art, other relevant drawings may be derived from these drawings without any creative effort.

DETAILED DESCRIPTION

Figure 1:
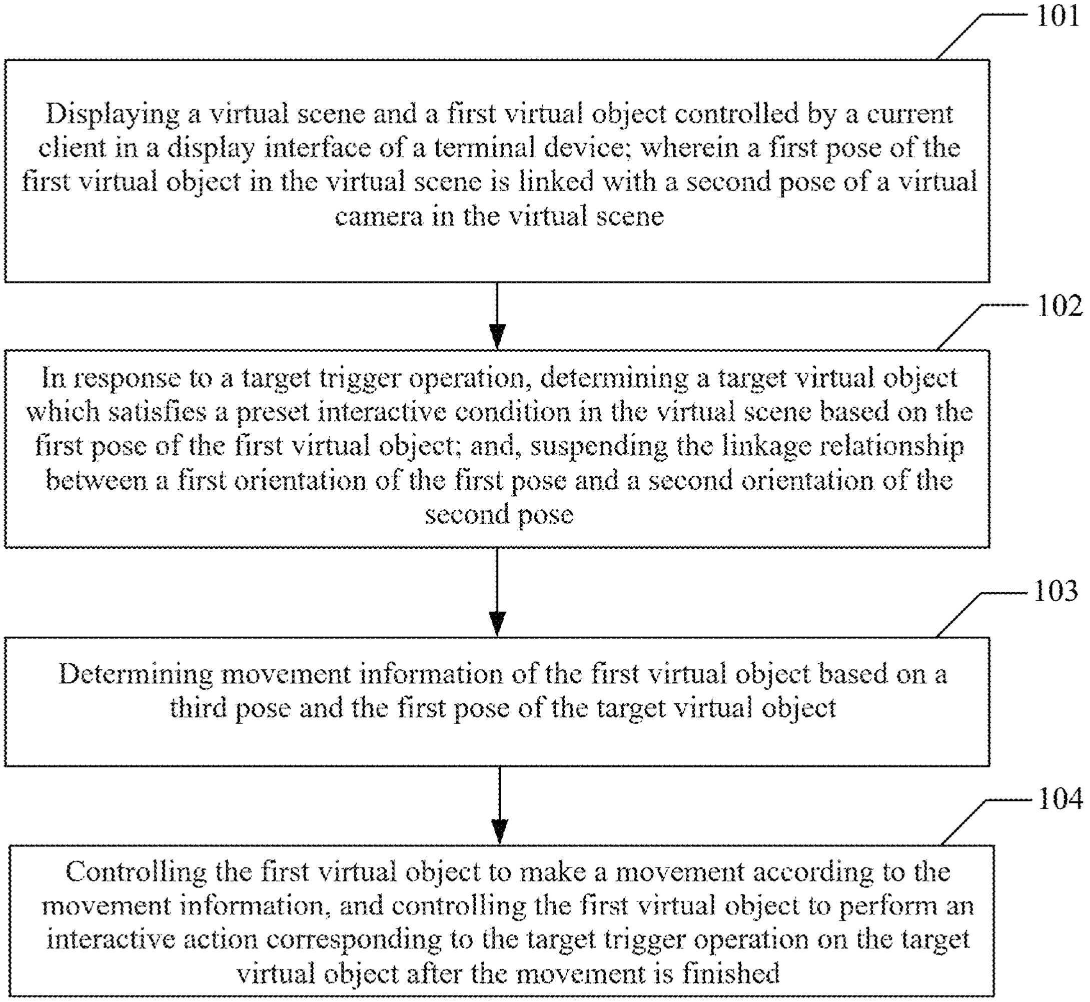
FIG. 1 is a flowchart of a virtual object control method provided by some embodiments of the present disclosure.

To make the objectives, technical solutions and advantages of the embodiments of the present disclosure more clearly comprehensible, the technical solutions in the embodiments of the present disclosure will be described clearly and completely with reference to the accompanying drawings in the embodiments of the present disclosure, and the embodiments as described are only a part of the embodiments of the present disclosure, rather than all of the embodiments. The components of the embodiments of the present disclosure, as described and illustrated in the accompanying drawings herein, can generally be arranged and designed in a variety of different configurations. Thus, the following detailed description of the embodiments of the present disclosure, as provided in the accompanying drawings, is not intended to limit the scope of protection of the present disclosure, rather is merely representative of selected embodiments of the present disclosure. All other embodiments, which can be derived by those skilled in the art based on the embodiments of the present disclosure without making any creative effort, shall fall within the scope of protection of the present disclosure.

In a game from a third person's visual angle, the orientation of the virtual object controlled by the user is generally consistent with the visual angle direction of the picture displayed on the screen, in which case it is difficult for the user to perceive the distance between the controlled virtual object and other virtual objects, and thus, it can easily happen that other virtual objects are beyond the range of attack of the virtual object controlled by the user when the user is controlling the virtual object to attack other virtual objects with melee weapons, so that the virtual object controlled by the user fails to hit other virtual objects, which lowers the user experience.

According to a virtual object control method and apparatus, a computer device and a storage medium provided by the embodiments of the present disclosure, a virtual scene and a first virtual object controlled by a current client may be first displayed in a display interface of a terminal device; wherein a first pose of the first virtual object in the virtual scene is linked with a second pose of a virtual camera in the virtual scene; then, after a target trigger operation is responded, a target virtual object for interaction with the first virtual object is determined, and based on a third pose of the target virtual object and the first pose of the first virtual object, movement: information of the first virtual object is determined, so that subsequent to controlling the first virtual object to make a movement according to the movement information, it can be guaranteed that the target virtual object is located within the interaction range of the interactive action to be performed by the first virtual object, and accordingly, the first virtual object can be controlled to successfully perform an interactive action corresponding to the target trigger operation on the target virtual object after the movement is finished.

Furthermore, after the target triggering operation is responded, the linkage relationship between the first orientation of the first pose and the second orientation of the second pose can be suspended, so that the visual angle of the picture displayed on the display interface cannot be rotated along with the rotation of the first orientation of the first virtual object, which avoids, to a certain extent, the problem that the visual angle of the picture rotates too fast, and the distance between the first virtual object and the target virtual object and the action details of the first virtual object can be better observed by the user from other angles, thereby improving the display effect.

Based on the above studies, the present disclosure provides a virtual object control method and apparatus, a computer device and a storage medium, in which a virtual scene and a first virtual object controlled by a current client may be first displayed in a display interface of a terminal device; wherein a first pose of the first virtual object in the virtual scene is linked with a second pose of a virtual camera in the virtual scene; then, after a target trigger operation is responded, a target virtual object for interaction with the first virtual object is determined, and based on a third pose of the target virtual object and the first pose of the first virtual object, movement information of the first virtual object is determined, so that subsequent to controlling the first virtual object to make a movement according to the movement information, it can be guaranteed that the target virtual object is located within the interaction range of the interactive action to be performed by the first virtual object, and accordingly, the first virtual object can be controlled to successfully perform an interactive action corresponding to the target trigger operation on the target virtual object after the movement is finished.

Furthermore, after the target triggering operation is responded, the linkage relationship between the first orientation of the first pose and the second orientation of the second pose can be suspended, so that the visual angle of the picture displayed on the display interface cannot be rotated along with the rotation of the first orientation of the first virtual object, which avoids, to a certain extent, the problem that the visual angle of the picture rotates too fast, and the distance between the first virtual object and the target virtual object and the action details of the first virtual object can be better observed by the user from other angles, thereby improving the display effect.

It should be noted that similar reference signs and letters refer to similar items in the subsequent drawings, and thus, once an item is defined in one drawing, it is not necessary to further define and explain it in the subsequent drawings.

The term "and/or" herein merely describes an associative relationship, meaning that three relationships may exist, e.g., A and/or B may mean three cases, namely A exists alone, A and B exist simultaneously, and B exists alone. In addition, the term "at least one (item)" herein means any one (item) or any combination of at least two of multiple (items), for example, including at least one of A, B and C may mean including any one or more elements selected from the group consisting of A, B and C.

It may be understood that, prior to the implementation of the technical solutions disclosed in the embodiments of the present disclosure, users shall be informed of the type, the range of use, the scenarios of use, etc. of personal information related to the present disclosure in a proper manner in accordance with relevant laws and regulations, and authorization of the users shall be obtained.

For example, in response to the receipt of a user's proactive request, prompt information is sent to the user to explicitly prompt the user that the requested operation to be performed would require acquisition and use of personal information of the user. Accordingly, the user can autonomously select whether to provide personal information to software or hardware, such as a computer device, an application program, a server or a storage medium that performs the operations of the technical solution of the present disclosure, according to the prompt information.

As an optional but non-limiting implementation manner, in response to the receipt of a user's proactive request, sending the prompt information to the user may take the form of, for example, a pop-up window, and the prompt information may be presented in a text manner in the pop-up window. In addition, a selection control for the user to choose to "agree" or "disagree" the presentation of personal information to the computer device can be further carried in the pop-up window.

It may be understood that the above process of notification and acquisition of a user's authorization is only illustrative and is not intended to limit the implementation manner of the present disclosure, and other manners satisfying the relevant laws and regulations may also be applied to the implementation of the present disclosure.

To facilitate understanding of the present embodiments, a virtual object control method as disclosed in the embodiments of the present disclosure will be first described in detail. The execution subject of the virtual object control method provided by the embodiments of the present disclosure is usually a terminal device, which is, for example, a tablet computer, a personal computer, a smart phone, a virtual reality/augmented reality device, and the like. In some possible implementations, the virtual object control method may be implemented by a processor calling computer-readable instructions stored in a memory.

Referring to FIG. 1, which is a flowchart of a virtual object control method provided by the embodiments of the present disclosure, the method comprises Step 101 to Step 104, wherein:

Step 101, displaying a virtual scene and a first virtual object controlled by a current client in a display interface of a terminal device; wherein a first pose of the first virtual object in the virtual scene is linked with a second pose of a virtual camera in the virtual scene;

Step 102, in response to a target trigger operation determining a target virtual object which satisfies a preset interactive condition in the virtual scene based on the first pose of the first virtual object; and, suspending the linkage relationship between a first orientation of the first pose and a second orientation of the second pose;

Step 103, determining movement information of the first virtual object based on a third pose of the target virtual object and the first pose; and Step 104, controlling the first virtual object to make a movement according to the movement information, and controlling the first virtual object to perform an interactive action corresponding to the target trigger operation on the target virtual object after the movement is finished.

Figure 2:
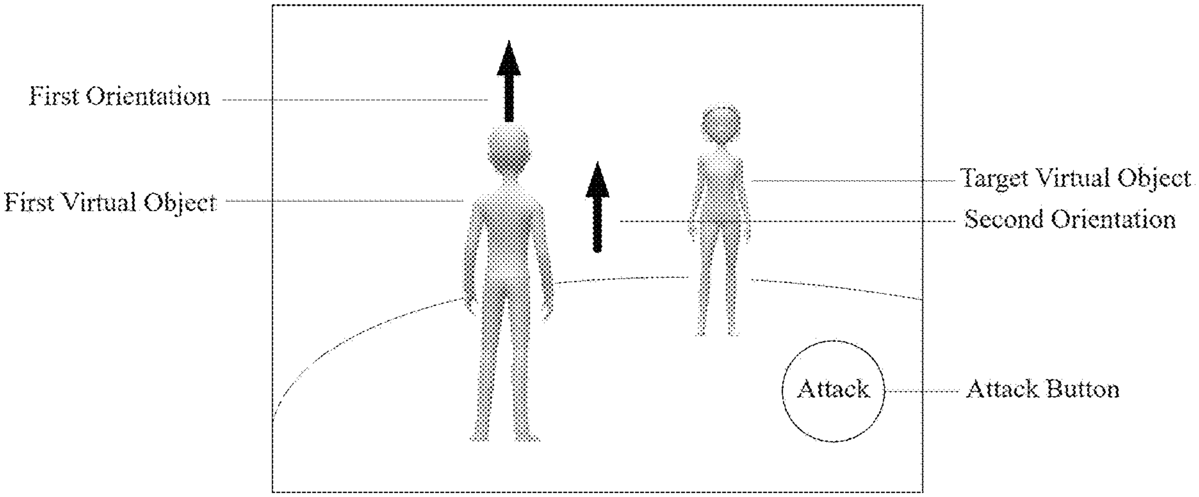
FIG. 2 is a schematic diagram of a display interface with a linkage relationship between a first orientation and a second orientation provided by some embodiments of the present disclosure.

Below are detailed descriptions of the above steps:

For Step 101,

Specifically, as shown in FIG. 2, the virtual scene is a three-dimensional virtual scene, and the virtual scene may include at least one virtual object which may be, for example, a virtual character (e.g., a cartoon character). The virtual camera is used for representing a starting point of a display visual angle of the virtual scene, and a part of the virtual scene displayed by the display interface is namely a part of the virtual scene within a corresponding visual angle range of a second orientation of the virtual camera.

The first pose may include a first position and a first orientation, the second pose may include a second position and a second orientation, the first position may be a three-dimensional coordinate of the first virtual object in the virtual scene, and the second position may be a three-dimensional coordinate of the second virtual object in the virtual scene.

A first pose of the first virtual object in the virtual scene being linked with a second pose of a virtual camera in the virtual scene means that there is a preset relative positional relationship between the first position of the first virtual object and the second position of the virtual camera have, for example, the first virtual object can be in the direction of 45 degrees on the front left of the virtual camera and with a distance of 1 meter from the virtual camera; and, the first orientation rotates with the rotation of the second orientation (or the second orientation rotates with the rotation of the first orientation). For example, when the first virtual object is controlled to move 5 meters to the left, the virtual camera will move 5 meters to the left therewith, and when the second orientation of the virtual camera is controlled to rotate 10 degrees clockwise, the first orientation of the first virtual object will rotate 10 degrees clockwise therewith.

Here, as shown in FIG. 2, the first orientation of the first virtual object and the second orientation of the virtual camera may be the same (the first orientation and the second orientation in FIG. 2 are forward directions), so that in the case where the first orientation and the second orientation are linked, the first virtual object will always keep the same orientation as the virtual camera, which makes the display effect of the first virtual object more realistic.

For Step 102,

Specifically, the target trigger operation is used to control the first virtual object to perform an interactive action corresponding to the target trigger operation, wherein the target trigger operation may be a trigger operation on a target button, for example, as shown in FIG. 2, the display interface may display an attack button, and the target trigger operation may be a click operation on the attack button.

The preset interactive condition may include a display position condition of the virtual object, an attribute condition of the virtual object, etc., wherein the display position condition may be, for example, within a target area, within the first distance range from the first position of the first virtual object, etc., and the attribute condition may be, for example, that the attribute information of the virtual object includes a target attribute (e.g., "enemy" or "task").

Figure 3:
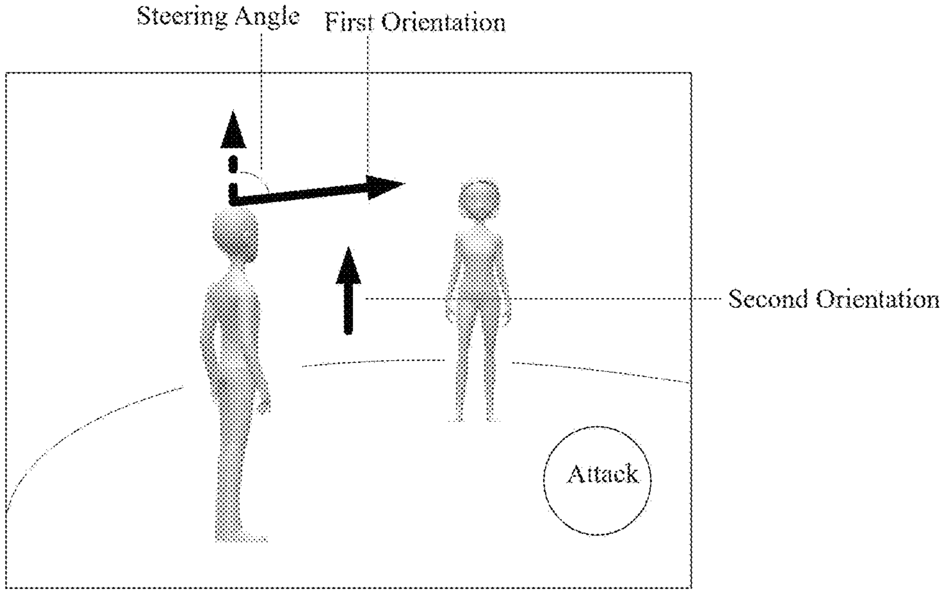
FIG. 3 is a schematic diagram of a display interface after suspension of the linkage relationship between the first orientation and the second orientation provided by some embodiments of the present disclosure.

After the linkage relationship between a first orientation of the first pose and a second orientation of the second pose is suspended, the second orientation remains unchanged, for example, as shown in FIG. 3, if after the first virtual object rotates, the first orientation changes, but the second orientation does not change, the first virtual object is still displayed according to the previous second orientation, so that a rapid rotation of a picture angle (the second orientation) is avoided, and in the case where the second orientation does not change after the first orientation of the first virtual object changes, the display interface will display the first virtual object at other angles, so that the action details of the first virtual object can be displayed from other angles, thereby improving the user experience.

In a possible implementation, the preset interactive condition is that in the case of being within a first distance range from the first position of the first virtual object, in determining a target virtual object which satisfies a preset interactive condition in the virtual scene based on the first pose of the first virtual object, a plurality of second virtual objects included in the virtual scene may be first determined, then distances between the plurality of second virtual objects and the first virtual object may be calculated respectively according to the positions of the plurality of second virtual objects and the first position, and then the second virtual object whose distance is within the first distance range may be taken as the target virtual object.

Illustratively, if the distances between the second virtual objects and the first virtual object are respectively 70 meters, 10 meters and 50 meters, and if the first distance range is within 30 meters, the second virtual object corresponding to the distance of 10 meters is determined as the target virtual object.

By adopting this method, a second virtual object with a smaller distance from the first virtual object may be determined as the target virtual object and an interactive action is performed.

Here, if there are a plurality of second virtual objects that satisfy the preset interactive condition, the target virtual object may be further screened out from the plurality of second virtual objects. Therefore, in another possible implementation, when determining a target virtual object which satisfies a preset interactive condition in the virtual scene based on the first pose of the first virtual object, the following steps A1 to A3 may be adopted:

A1, determining, from a plurality of second virtual objects included in the virtual scene, candidate virtual objects located within a first distance range from the first position of the first virtual object;

Specifically, distances between the plurality of second virtual objects and the first virtual object may be calculated respectively according to the positions of the plurality of second virtual objects and the first position, and then the second virtual object whose distance is within the first distance range may be taken as a candidate virtual object.

A2, determining a target angle between a third orientation of each candidate virtual object relative to the virtual camera and the second orientation.

Herein, the third orientation is namely a direction in which the virtual camera points to the candidate virtual object. For example, a central point of each virtual object may be preset, and then a direction in which the virtual camera points to the central point of the candidate virtual object may be taken as the third orientation.

A3, determining the target virtual object from the candidate virtual objects based on the target angle.

Specifically, the sizes of the target angles may be compared first, and then the candidate virtual object with the smallest target angle may be determined as the target virtual object. Illustratively, if the target angles corresponding to the candidate virtual objects are 10 degrees, 20 degrees or 30 degrees respectively, the candidate virtual object with a corresponding target angle of 10 degrees is determined as the target virtual object.

By adopting this method, the candidate virtual object having a smaller angle with the second orientation of the virtual camera can be screened out from the plurality of candidate virtual objects to serve as the target virtual object, so that the candidate virtual object which is displayed in the display interface and which is closest to the center is perceived as the target virtual object by the user, which better conforms with the habit of the user and improves the user experience.

Here, if the target virtual object is located out of the visual angle range of the virtual camera, the situation will occur in which a second virtual object not shown in the display interface is determined as the target virtual object, thereby affecting the user experience, and therefore, in a possible embodiment, the preset interactive condition may further include: only the second virtual object which is located within the visual angle range corresponding to the second orientation of the virtual camera, namely that displayed on the display interface of the terminal device, may be determined as the target virtual object.

Specifically, the candidate virtual object having the target angle within a preset angle range may be determined as the target virtual object, for example, the target angles corresponding to the candidate virtual objects are respectively 10 degrees, 50 degrees, and 60 degrees, if the preset angle range is 0 to 45 degrees, the candidate virtual object corresponding to 10 degrees is determined as the target virtual object. Here, if none of the target angles corresponding to the candidate virtual objects is within the preset angle range, it is determined that the target virtual object does not exist.

In a possible implementation, subsequent to suspending the linkage relationship between a first orientation of the first pose and a second orientation of the second pose, the second orientation may be further adjusted in response to a target slide operation to cause the display device to display the first virtual object at a different angle.

Specifically, after the target slide operation is performed on the display interface, the sliding direction of the target slide operation may be determined first, the camera rotation angle corresponding to the sliding direction may be determined, and then the second orientation may be updated according to the camera rotation angle. For example, if the user slides 1 cm to the left on the display interface, it may be determined that the camera rotation angle is 30 degrees, and if the second orientation is 80 degrees, the second orientation may be gradually increased to 110 degrees as the user slide operation progresses.

By adopting the method, the user may be allowed to control the angle of the first virtual object displayed on the display interface, so that the user may be allowed to observe the action details of the first virtual object from other angles, thereby improving the user experience.

In a possible implementation, subsequent to suspending the linkage relationship between a first orientation of the first pose and a second orientation of the second pose, it is further possible to respond to a movement control operation of the first virtual object, to control the first virtual object to make a movement according to the movement control operation, and to reestablish the linkage relationship between the first orientation and the second orientation.

Herein, the movement control operation may be, for example, a trigger operation on a movement control area displayed on the display interface or may be a trigger operation on a movement key or joystick of the terminal device.

Specifically, when the first virtual object is controlled to make a movement according to the movement control operation, it may be a movement according to a target direction corresponding to the movement control operation, and for example, in the case where the movement control operation is sliding leftward within the movement control area, and the target direction corresponding to the movement control operation is left, the first virtual object may be controlled to make a leftward movement.

Then, in reestablishing the linkage relationship between the first orientation and the second orientation, it may be the case that the first orientation is rotated again with the rotation of the second orientation, or the second orientation is rotated with the rotation of the first orientation.

In a possible implementation, subsequent to reestablishing the linkage relationship between the first orientation and the second orientation, in the case where it is detected that the current first orientation of the first virtual object and the current second orientation of the virtual camera are inconsistent, the first orientation of the first virtual object is adjusted, or the second orientation of the virtual camera is adjusted.

Specifically, the first orientation of the first virtual object may be controlled to be rotated as the same as the second orientation of the virtual camera, or the second orientation of the virtual camera may be controlled to be rotated as the same as the first orientation of the first virtual object, so as to make the first orientation and the second orientation the same again.

Here, Step 103 may also be no longer performed, i.e. the first virtual object is no longer caused to perform the interactive action, after responding to the movement control operation for the first virtual object.

By adopting the method, through the control of the user, the linkage relationship between the first orientation and the second orientation can be recovered, and/or the first virtual object can be stopped from performing the interactive action, and the movement behavior corresponding to the latest trigger movement control operation of the user is performed, so that the user can more flexibly control the display visual angle (namely the second orientation) of the display interface and/or the first virtual object, thereby improving the user experience.

For Step 103,

Herein, the third pose may include a third position and an orientation of the target virtual object, the third position may be a three-dimensional coordinate of the target virtual object in the virtual scene, the movement information may include a movement distance, a steering angle, a movement direction, a movement speed, and the like, and the steering angle is an angle at which the first virtual object needs to be deflected toward the target virtual object.

In a possible implementation, when determining movement information of the first virtual object, it may be the case that the movement direction is determined based on the third position and the first position, and the steering angle is determined based on the movement direction and the first orientation; and, the movement distance is determined based on the third position and the first position.

Specifically, when determining the movement direction and the steering angle, the direction of the target virtual object with respect to the first virtual object may be first determined based on the first position and the third position, and the direction may be taken as the movement direction, and then the angle between the movement direction and the first orientation may be taken as the steering angle. In determining the movement distance, a distance between the first position and the third position may be taken as the movement distance. When the movement speed is determined, the movement speed may be a preset fixed speed, or the movement speed may be determined based on a virtual prop (such as a garment, a weapon, and the like, and the virtual prop may include a target prop described later) carried by the first virtual object, for example, different types of virtual props may correspond to different movement speeds (for example, the movement speed corresponding to a cold weapon type is 1 meter per second, and the movement speed corresponding to a hot weapon type is 0.5 meter per second), or different virtual props may correspond to different weights, and the movement speed of the first virtual object may be determined according to a total weight of the virtual props (for example, the movement speed corresponding to 0.5 to 2.5 Kilogram is 1 meter per second, and the movement speed corresponding to 2.5 to 5 Kilogram is 0.5 meter per second).

In practical applications, if the interactive action to be performed by the first virtual object also has a certain execution range (for example, the interactive action is to pat the shoulder, and the length of the arm of the first virtual object is namely the execution range), or because the respective models of the first virtual object and the target virtual object are also of certain volumes, when the first virtual object performs an interactive action on the target virtual object, the first virtual object should not overlap with the target virtual object, and after the distance between the first position and the third position is calculated, the execution range and/or the possible overlapping length between the models of the first virtual object and the second virtual object should be subtracted from the distance.

In a possible application scenario, when the first virtual object is performing an interactive action, the first virtual object can usually perform the interactive action with a target prop, for example, with a sword to chop the target virtual object, and the target prop usually has a certain length, for example, the sword is 1.5 meters long, and therefore, when the movement distance is determined, the corresponding range of action of the target prop also needs to be combined. Specifically, the responding to a target trigger operation (in Step 102) may also be responding to a target trigger operation on a target prop of the first virtual object, and then when determining movement information of the first virtual object based on a third pose of the target virtual object and the first pose, the movement information of the first virtual object may be determined based on the third pose of the target virtual object, the first pose, and the range of action corresponding to the target prop.

Specifically, different props may correspond to different trigger positions, for example, the display interface may display buttons of a plurality of different props, and in response to a trigger operation on any prop, the prop may be used as the target prop; or, the target prop used by the first virtual object may be changed in advance by the user, and then after the user performs the target trigger operation, it may be determined that the target trigger operation is the target trigger operation on the target prop. The range of action corresponding to the target prop can be preset, for example, the range of action corresponding to the target prop sword is 1.5 meters, and the range of action corresponding to the target prop dagger is 1 meter.

In a possible implementation, when the movement information of the first virtual object is determined based on the third pose of the target virtual object, the first pose, and the range of action corresponding to the target prop, the movement direction may be determined based on the third position and the first position, and the steering angle may be determined based on the movement direction and the first orientation; and, the movement distance is determined based on the third position, the first position, and the range of action corresponding to the target prop.

Specifically, when determining the steering angle, the direction of the target virtual object with respect to the first virtual object may be first determined based on the first position and the third position, and the direction may be taken as the movement direction, and then the angle between the movement direction and the first orientation may be calculated and taken as the steering angle.

In determining the movement distance, the distance between the first position and the third position may be first calculated, and then the range of action (e.g., 1 meter) corresponding to the target prop is subtracted from the distance, so as to obtain the movement distance.

By adopting the method to calculate the movement distance, the first virtual object, when making a movement according to the movement information, can accurately move to the position where the interaction action with the target virtual object can be completed by using the target prop so that the user experience is improved.

For Step 104,

In a possible implementation manner, when the first virtual object is controlled to make a movement according to the movement information, it may be the case that the first virtual object is controlled to move the movement distance along the movement direction, and after the movement is finished, the distance between the first virtual object and the target virtual object may allow the first virtual object to perform an interactive action corresponding to the target trigger operation on the target virtual object. For example, the first virtual object may move to a position 0.5 meters away from the target virtual object and perform a punch action on the target virtual object.

In another possible implementation, when the first virtual object is controlled to make a movement according to the movement information, the first virtual object may be controlled to adjust the first orientation according to the steering angle and to make a movement according to the movement distance.

Here, when making a movement according to the movement information, it may be the case of making a movement according to the movement direction or the adjusted first orientation.

For example, as shown in FIG. 3, if the steering angle is 60 degrees and the movement distance is 2 meters, the first virtual object may be rotated clockwise by 60 degrees to make the first orientation of the first virtual object directly face the target virtual object, and then the first virtual object may be controlled to move 2 meters in the first orientation.

Here, since the target virtual object may be in a moving state, the steering angle may be calculated in real time before the first virtual object moves, and the first orientation of the first virtual object may be adjusted according to the steering angle, so that the first orientation of the first virtual object always faces the target virtual object.

By adopting this method, the first virtual object can be made to face the target virtual object when moving toward the target virtual object, so that the display effect is more natural and real.

In a possible implementation, after the first virtual object is controlled to perform an interactive action corresponding to the target trigger operation on the target virtual object, in the case where within a preset time period after the target trigger operation is responded it is not detected that a target trigger operation is performed again, or in the case where the state of the target virtual object satisfies a preset condition, the linkage relationship between the first orientation and the second orientation is reestablished.

Specifically, if the linkage relationship between the first orientation and the second orientation is established immediately after the first virtual object performs the interactive action, in the case where the user performs the target trigger operation again to control the first virtual object to perform the interactive action again (for example, in the case where the user wants to control the first virtual object to continuously attack the target virtual object), the linkage relationship between the first orientation of the first pose and the second orientation of the second pose will be suspended again, which will cause the angle of the displayed picture of the display interface or the first orientation of the first virtual object to be rotated back and forth, thereby lowering the user experience, and if after the target trigger operation is responded it is not detected that a target trigger operation is performed again within a preset time period, it may indicate that the user no longer wants the first virtual object to perform the interactive action again, the linkage relationship between the first orientation and the second orientation can then be restored.

The state of the target virtual object may include the pose of the target virtual object and the attribute information of the target virtual object (such as a life value, whether the target virtual object is dead or not, whether the target virtual object is an interactable object or not, and the attribute information is different for different application programs and can be set by developers). For example, the preset condition may be that the life value of the target virtual object is 0, or the distance between the third position of the target virtual object and the first position of the first virtual object (or the second position of the virtual camera) exceeds a second distance range (the second distance range may be equal to the first distance range), in which case obviously no interactive action should be performed on the target virtual object any more, and then the linkage relationship between the first orientation and the second orientation may be restored.

According to a virtual object control method provided by the embodiments of the present disclosure, a virtual scene and a first virtual object controlled by a current client may be first displayed in a display interface of a terminal device; wherein a first pose of the first virtual object in the virtual scene is linked with a second pose of a virtual camera in the virtual scene; then, after a target trigger operation is responded, a target virtual object for interaction with the first virtual object is determined, and based on a third pose of the target virtual object and the first pose of the first virtual object, movement information of the first virtual object is determined, so that subsequent to controlling the first virtual object to make a movement according to the movement information, it can be guaranteed that the target virtual object is located within the interaction range of the interactive action to be performed by the first virtual object, and accordingly, the first virtual object can be controlled to successfully perform an interactive action corresponding to the target trigger operation on the target virtual object after the movement is finished.

Furthermore, after the target triggering operation is responded, the linkage relationship between the first orientation of the first pose and the second orientation of the second pose can be suspended, so that the visual angle of the picture displayed on the display interface cannot be rotated along with the rotation of the first orientation of the first virtual object, which avoids, to a certain extent, the problem that the visual angle of the picture rotates too fast, and the distance between the first virtual object and the target virtual object and the action details of the first virtual object can be better observed by the user from other angles, thereby improving the display effect.

It can be understood by those skilled in the art that in the above method of the specific embodiment, the order in which the steps are listed does not imply a strict order of execution and does not impose any limitation on the implementing process, rather the specific order of execution of the steps should be determined by functions and possible inherent logic thereof.

Based on the same inventive concept, a virtual object control apparatus corresponding to the virtual object control method is further provided in the embodiments of the present disclosure, and since the problem-solving principle of the apparatus in the embodiments of the present disclosure is similar to the above virtual object control method in the embodiments of the present disclosure, references can be made to the implementation of the method for the implementation of the apparatus, and the repeated parts are no longer described herein.

Figure 4:
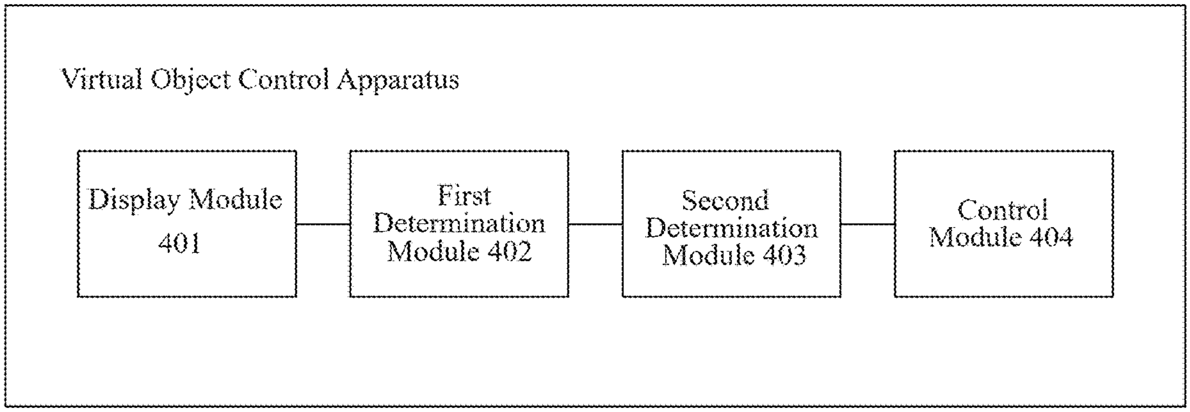
FIG. 4 is a schematic structural diagram of a virtual object control apparatus provided by some embodiments of the present disclosure.

Referring to FIG. 4, which is a schematic structural diagram of a virtual object control apparatus provided by the embodiments of the present disclosure, the apparatus comprises a display module 401, a first determination module 402, a second determination module 403, and a control module 404; wherein a display module 401 is configured to display a virtual scene and a first virtual object controlled by a current client in a display interface of a terminal device; wherein a first pose of the first virtual object in the virtual scene is linked with a second pose of a virtual camera in the virtual scene;

a first determination module 402 is configured to determine a target virtual object which satisfies a preset interactive condition in the virtual scene based on the first pose of the first virtual object responding to a target trigger operation; and, suspend the linkage relationship between a first orientation of the first pose and a second orientation of the second pose;

a second determination module 403 is configured to determine movement information of the first virtual object based on a third pose of the target virtual object and the first pose; and a control module 404 is configured to control the first virtual object to make a movement according to the movement information and control the first virtual object to perform an interactive action corresponding to the target trigger operation on the target virtual object after the movement is finished.

In a possible implementation, the first pose further comprises a first position, and the second pose further comprises a second position;

the first determination module 402, when determining a target virtual object which satisfies a preset interactive condition in the virtual scene based on the first pose of the first virtual object, is configured to:

determine, from a plurality of second virtual objects included in the virtual scene, candidate virtual objects located within a first distance range from the first position of the first virtual object;

determine a target angle between a third orientation of each candidate virtual object relative to the virtual camera and the second orientation; and determine the target virtual object from the candidate virtual objects based on the target angle.

In a possible implementation, the first determination module 402, when responding to a target trigger operation, is configured to:

respond to a target trigger operation on a target prop of the first virtual object;

the second determination module 403, when determining movement information of the first virtual object based on a third pose of the target virtual object and the first pose, is configured to:

determine movement information of the first virtual object based on a third pose of the target virtual object, the first pose and the corresponding range of action of the target prop.

In a possible implementation, the movement information includes a movement distance and a steering angle, wherein the steering angle is an angle at which the first virtual object needs to be deflected toward the target virtual object, the third pose comprises a third position, and the first pose comprises a first position;

the second determination module 403, when determining movement information of the first virtual object based on a third pose of the target virtual object, the first pose and the corresponding range of action of the target prop, is configured to:

determine the movement direction based on the third position and the first position, and determine the steering angle based on the movement direction and the first orientation; and determine the movement distance based on the third position, the first position and the corresponding range of action of the target prop;

the control module 404, when controlling the first virtual object to make a movement according to the movement information, is configured to:

control the first virtual object to adjust the first orientation according to the steering angle and to make a movement according to the movement distance.

In a possible implementation, subsequent to controlling the first virtual object to perform an interactive action corresponding to the target trigger operation on the target virtual object, the apparatus is further used for:

in the case where within a preset time period after the target trigger operation is responded it is not detected that a target trigger operation is performed again, or in the case where the state of the target virtual object satisfies a preset condition, reestablishing the linkage relationship between the first orientation and the second orientation.

In a possible implementation, subsequent to suspending the linkage relationship between a first orientation of the first pose and a second orientation of the second pose, the apparatus is further used for:

responding to a movement control operation of the first virtual object, controlling the first virtual object to make a movement according to the movement control operation, and reestablishing the linkage relationship between the first orientation and the second orientation.

In a possible implementation, subsequent to reestablishing the linkage relationship between the first orientation and the second orientation, the apparatus is further used for:

in the case where it is detected that the current first orientation of the first virtual object and the current second orientation of the virtual camera are inconsistent, adjusting the first orientation of the first virtual object, or adjusting the second orientation of the virtual camera.

For the description of the processing flow of each module in the apparatus and the interaction flow between the modules, references may be made to the relevant description in the above method embodiments and will not be described in detail herein.

Figure 5:
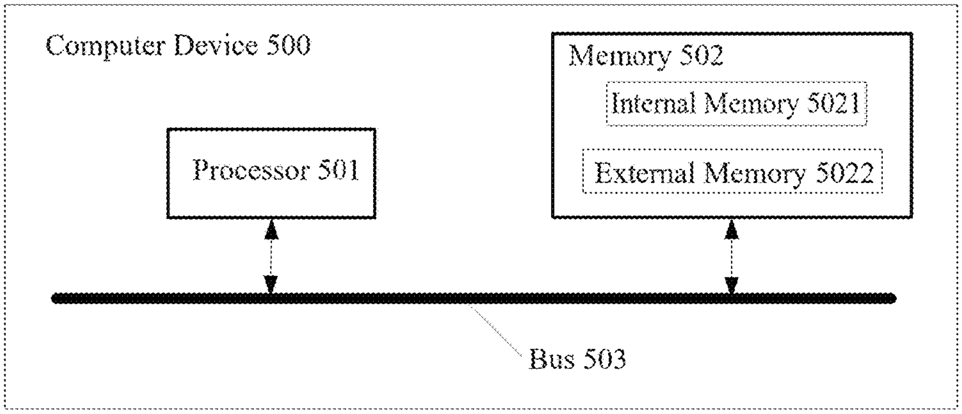
FIG. 5 is a schematic structural diagram of a computer device provided by some embodiments of the present disclosure.

Based on the same technical concept, the embodiments of the present disclosure further provide a computer device. Referring to FIG. 5, which is a schematic structural diagram of a computer device 500 provided by the embodiments of the present disclosure, the computer device comprises a processor 501, a memory 502 and a bus 503. Herein, the memory 502 is configured to store execution instructions and includes an internal memory 5021 and an external memory 5022; the internal memory 5021 here is also referred to as an internal storage, which is configured to temporarily store computing data in the processor 501 and data exchanged with the external memory 5022 such as a hard disk, and the processor 501 exchanges data with the external memory 5022 via the internal memory 5021. When the computer device 500 runs, the processor 501 communicates with the memory 502 via the bus 503, so that the processor 501 executes the following instructions:

displaying a virtual scene and a first virtual object controlled by a current client in a display interface of a terminal device; wherein a first pose of the first virtual object in the virtual scene is linked with a second pose of a virtual camera in the virtual scene;

in response to a target trigger operation, determining a target virtual object which satisfies a preset interactive condition in the virtual scene based on the first pose of the first virtual object; and, suspending the linkage relationship between a first orientation of the first pose and a second orientation of the second pose;

determining movement information of the first virtual object based on a third pose of the target virtual object and the first pose; and controlling the first virtual object to make a movement according to the movement information and controlling the first virtual object to perform an interactive action corresponding to the target trigger operation on the target virtual object after the movement is finished.

In a possible implementation, in the instructions executed by the processor 501, the first pose further comprises a first position, and the second pose further comprises a second position;

the determining a target virtual object which satisfies a preset interactive condition in the virtual scene based on the first pose of the first virtual object comprises:

determining, from a plurality of second virtual objects included in the virtual scene, candidate virtual objects located within a first distance range from the first position of the first virtual object;

determining a target angle between a third orientation of each candidate virtual object relative to the virtual camera and the second orientation; and determining the target virtual object from the candidate virtual objects based on the target angle.

In a possible implementation, in the instructions executed by the processor 501, the responding to a target trigger operation comprises:

responding to a target trigger operation on a target prop of the first virtual object;

the determining movement information of the first virtual object based on a third pose of the target virtual object and the first pose comprises:

determine movement information of the first virtual object based on a third pose of the target virtual object, the first pose and the corresponding range of action of the target prop.

In a possible implementation, in the instructions executed by the processor 501, the movement information includes a movement distance and a steering angle, wherein the steering angle is an angle at which the first virtual object needs to be deflected toward the target virtual object, the third pose comprises a third position, and the first pose comprises a first position;

the determining movement information of the first virtual object based on a third pose of the target virtual object, the first pose and the corresponding range of action of the target prop comprises:

determine the movement direction based on the third position and the first position, and determine the steering angle based on the movement direction and the first orientation; and determine the movement distance based on the third position, the first position and the corresponding range of action of the target prop;

the controlling the first virtual object to make a movement according to the movement information comprises:

controlling the first virtual object to adjust the first orientation according to the steering angle and to make a movement according to the movement distance.

In a possible implementation, in the instructions executed by the processor 501, subsequent to controlling the first virtual object to perform an interactive action corresponding to the target trigger operation on the target virtual object, the method further comprises:

in the case where within a preset time period after the target trigger operation is responded it is not detected that a target trigger operation is performed again, or in the case where the state of the target virtual object satisfies a preset condition, reestablishing the linkage relationship between the first orientation and the second orientation.

In a possible implementation, in the instructions executed by the processor 501, subsequent to suspending the linkage relationship between a first orientation of the first pose and a second orientation of the second pose, the method further comprises:

in response to a movement control operation of the first virtual object, controlling the first virtual object to make a movement according to the movement control operation, and reestablishing the linkage relationship between the first orientation and the second orientation.

In a possible implementation, in the instructions executed by the processor 501, subsequent to reestablishing the linkage relationship between the first orientation and the second orientation, the method further comprises:

in the case where it is detected that the current first orientation of the first virtual object and the current second orientation of the virtual camera are inconsistent, adjusting the first orientation of the first virtual object, or adjusting the second orientation of the virtual camera.

The embodiments of the present disclosure further provide a computer-readable storage medium, wherein the computer-readable storage medium stores thereon a computer program, and when the computer program is executed by a processor, the steps of the virtual object control method in the above method embodiments are implemented. Herein, the storage medium may be a volatile or non-volatile computer-readable storage medium.

The embodiments of the present disclosure further provide a computer program product, wherein the computer program product carries program code, and instructions included in the program code may be used to execute the steps of the virtual object control method in the above method embodiments. Reference can be made to the above method embodiments, and no further description is made herein.

Herein, the above computer program product may be implemented by hardware, software or a combination thereof. In an optional embodiment, the computer program product is embodied as a computer storage medium, and in another optional embodiment, the computer program product is embodied as a software product, such as Software Development Kit (SDK) or the like.

It can be clearly understood by those skilled in the art that, in view of convenience and simplicity of description, for the specific working process of the system and the apparatus as described above, references may be made to the corresponding process in the foregoing method embodiments, and no more details are described herein. In the several embodiments provided in the present disclosure, it should be understood that the disclosed system, apparatus and method may be implemented in other ways. The above-described apparatus embodiments are merely illustrative; for example, the division of the units is merely one type of logical function division, and in practical implementation, other division manners may exist; a further example is that multiple units or components may be combined or integrated into another system, or some features may be omitted or not implemented. In addition, the shown or discussed coupling or direct coupling or communication connection between one another may be realized via some communication interfaces, and indirect coupling or communication connection between devices or units and may be in an electrical, mechanical or other form.

The units described as separate components may or may not be physically separate, and components displayed as units may or may not be physical units, that is, they may be located in one position, or may be distributed on multiple network units. Some or all of the units can be selected according to actual needs to achieve the purpose of the solution of the present embodiment.

In addition, functional units in the embodiments of the present disclosure may be integrated into one processing unit, or each unit may exist alone physically, or two or more units may be integrated into one unit.

The functions, if implemented in software functional units and sold or used as a stand-alone product, may be stored in a non-transitory computer-readable storage medium which is executable by a processor. Based on such understanding, the essential part or the part contributing to the prior art of the technical solutions of the present disclosure, or parts of the technical solutions, may be embodied in the form of a software product, and the computer software product is stored in a storage medium and comprises several instructions for enabling a computer device (which may be a personal computer, a server, or a network device) to execute all or part of the steps of the method described in the embodiments of the present disclosure. And the aforementioned storage medium includes U disk, removable hard disk, Read-Only Memory (ROM), Random Access Memory (RAM), magnetic disk or optical disk, and other media that can store program code.

Finally, it should be noted that, the embodiments as described above are merely specific implementations of the present disclosure, which are only intended to be used for illustrating the technical solutions of the present disclosure, rather than for limiting the same, and the scope of protection of the present disclosure is not limited thereto; although the present disclosure has been described in detail with reference to the above-mentioned embodiments, those of ordinary skill in the art shall understand that the technical solutions described in the above-mentioned embodiments may still be modified or changed in a conceivable manner, or some or all of the technical features may be equivalently replaced within the technical scope as disclosed by the present disclosure by any one of ordinary skill in the art; however, such modifications or replacements will not cause the essence of the corresponding technical solutions to depart from the scope of the technical solutions of the embodiments of the present disclosure, and they should be construed as being included therein. Thus, the scope of protection of the present disclosure shall be determined by the terms of the claims.

What is claimed is:

1. A virtual object control method, comprising:

displaying a virtual scene and a first virtual object controlled by a current client in a display interface of a terminal device; wherein a first pose of the first virtual object in the virtual scene is linked with a second pose of a virtual camera in the virtual scene;

in response to a target trigger operation, determining a target virtual object which satisfies a preset interactive condition in the virtual scene based on the first pose of the first virtual object; and, suspending the linkage relationship between a first orientation of the first pose and a second orientation of the second pose;

determining movement information of the first virtual object based on a third pose of the target virtual object and the first pose; and controlling the first virtual object to make a movement according to the movement information and controlling the first virtual object to perform an interactive action corresponding to the target trigger operation on the target virtual object after the movement is finished.

2. The method according to claim 1, wherein the first pose further comprises a first position and the second pose further comprises a second position;

the determining the target virtual object which satisfies a preset interactive condition in the virtual scene based on the first pose of the first virtual object comprises:

determining, from a plurality of second virtual objects included in the virtual scene, candidate virtual objects located within a first distance range from the first position of the first virtual object;

determining a target angle between a third orientation of each candidate virtual object relative to the virtual camera and the second orientation; and determining the target virtual object from the candidate virtual objects based on the target angle.

3. The method according to claim 1, wherein in response to the target trigger operation comprises:

in response to a target trigger operation on a target prop of the first virtual object;

the determining movement information of the first virtual object based on a third pose of the target virtual object and the first pose comprises:

determining movement information of the first virtual object based on a third pose of the target virtual object, the first pose and the corresponding range of action of the target prop.

4. The method according to claim 3, wherein the movement information includes a movement distance and a steering angle, wherein the steering angle is an angle at which the first virtual object needs to be deflected toward the target virtual object, the third pose comprises a third position, and the first pose comprises a first position;

the determining movement information of the first virtual object based on a third pose of the target virtual object, the first pose and the corresponding range of action of the target prop comprises:

determining the movement direction based on the third position and the first position, and determining the steering angle based on the movement direction and the first orientation; and determining the movement distance based on the third position, the first position and the corresponding range of action of the target prop;

the controlling the first virtual object to make a movement according to the movement information comprises:

controlling the first virtual object to adjust the first orientation according to the steering angle and to make a movement according to the movement distance.

5. The method according to claim 1, wherein, subsequent to controlling the first virtual object to perform an interactive action corresponding to the target trigger operation on the target virtual object, the method further comprises:

in the case where within a preset time period after the target trigger operation is responded it is not detected that a target trigger operation is performed again, or in the case where the state of the target virtual object satisfies a preset condition, reestablishing the linkage relationship between the first orientation and the second orientation.

6. The method according to claim 5, wherein, subsequent to reestablishing the linkage relationship between the first orientation and the second orientation, the method further comprises:

in the case where it is detected that the current first orientation of the first virtual object and the current second orientation of the virtual camera are inconsistent, adjusting the first orientation of the first virtual object, or adjusting the second orientation of the virtual camera.

7. The method according to claim 1, wherein, subsequent to suspending the linkage relationship between a first orientation of the first pose and a second orientation of the second pose, the method further comprises:

in response to a movement control operation of the first virtual object, controlling the first virtual object to make a movement according to the movement control operation, and reestablishing the linkage relationship between the first orientation and the second orientation.

8. A computer device, comprising: a processor, a memory and a bus, wherein the memory stores machine-readable instructions executable by the processor, the processor and the memory communicate via the bus when the computer device runs, and when the machine-readable instructions are executed by the processor, the steps of a virtual object control method implemented, the method comprising:

displaying a virtual scene and a first virtual object controlled by a current client in a display interface of a terminal device; wherein a first pose of the first virtual object in the virtual scene is linked with a second pose of a virtual camera in the virtual scene;

in response to a target trigger operation, determining a target virtual object which satisfies a preset interactive condition in the virtual scene based on the first pose of the first virtual object; and, suspending the linkage relationship between a first orientation of the first pose and a second orientation of the second pose;

determining movement information of the first virtual object based on a third pose of the target virtual object and the first pose; and controlling the first virtual object to make a movement according to the movement information and controlling the first virtual object to perform an interactive action corresponding to the target trigger operation on the target virtual object after the movement is finished.

9. The device according to claim 8, wherein the first pose further comprises a first position and the second pose further comprises a second position;

the determining a target virtual object which satisfies a preset interactive condition in the virtual scene based on the first pose of the first virtual object comprises:

determining, from a plurality of second virtual objects included in the virtual scene, candidate virtual objects located within a first distance range from the first position of the first virtual object;

determining a target angle between a third orientation of each candidate virtual object relative to the virtual camera and the second orientation; and determining the target virtual object from the candidate virtual objects based on the target angle.

10. The device according to claim 9, wherein in response to a target trigger operation comprises:

in response to a target trigger operation on a target prop of the first virtual object;

the determining movement information of the first virtual object based on a third pose of the target virtual object and the first pose comprises:

determining movement information of the first virtual object based on a third pose of the target virtual object, the first pose and the corresponding range of action of the target prop.

11. The device according to claim 10, wherein the movement information includes a movement distance and a steering angle, wherein the steering angle is an angle at which the first virtual object needs to be deflected toward the target virtual object, the third pose comprises a third position, and the first pose comprises a first position;

the determining movement information of the first virtual object based on a third pose of the target virtual object, the first pose and the corresponding range of action of the target prop comprises:

determining the movement direction based on the third position and the first position, and determining the steering angle based on the movement direction and the first orientation; and determining the movement distance based on the third position, the first position and the corresponding range of action of the target prop;

the controlling the first virtual object to make a movement according to the movement information comprises:

controlling the first virtual object to adjust the first orientation according to the steering angle and to make a movement according to the movement distance.

12. The device according to claim 8, wherein, subsequent to controlling the first virtual object to perform an interactive action corresponding to the target trigger operation on the target virtual object, the method further comprises:

in the case where within a preset time period after the target trigger operation is responded it is not detected that a target trigger operation is performed again, or in the case where the state of the target virtual object satisfies a preset condition, reestablishing the linkage relationship between the first orientation and the second orientation.

13. The device according to claim 12, wherein, subsequent to reestablishing the linkage relationship between the first orientation and the second orientation, the method further comprises:

in the case where it is detected that the current first orientation of the first virtual object and the current second orientation of the virtual camera are inconsistent, adjusting the first orientation of the first virtual object, or adjusting the second orientation of the virtual camera.

14. The device according to claim 8, wherein, subsequent to suspending the linkage relationship between a first orientation of the first pose and a second orientation of the second pose, the method further comprises:

in response to a movement control operation of the first virtual object, controlling the first virtual object to make a movement according to the movement control operation, and reestablishing the linkage relationship between the first orientation and the second orientation.

15. A non-transitory computer-readable storage medium, wherein the computer-readable storage medium stores thereon a computer program, and when the computer program is executed by a processor, the steps of a virtual object control method are implemented, the method comprising:

displaying a virtual scene and a first virtual object controlled by a current client in a display interface of a terminal device; wherein a first pose of the first virtual object in the virtual scene is linked with a second pose of a virtual camera in the virtual scene;

in response to a target trigger operation, determining a target virtual object which satisfies a preset interactive condition in the virtual scene based on the first pose of the first virtual object; and, suspending the linkage relationship between a first orientation of the first pose and a second orientation of the second pose;

determining movement information of the first virtual object based on a third pose of the target virtual object and the first pose; and controlling the first virtual object to make a movement according to the movement information and controlling the first virtual object to perform an interactive action corresponding to the target trigger operation on the target virtual object after the movement is finished.

16. The medium according to claim 15, wherein the first pose further comprises a first position and the second pose further comprises a second position;

the determining a target virtual object which satisfies a preset interactive condition in the virtual scene based on the first pose of the first virtual object comprises:

determining, from a plurality of second virtual objects included in the virtual scene, candidate virtual objects located within a first distance range from the first position of the first virtual object;

determining a target angle between a third orientation of each candidate virtual object relative to the virtual camera and the second orientation; and determining the target virtual object from the candidate virtual objects based on the target angle.

17. The medium according to claim 15, wherein in response to a target trigger operation comprises:

in response to a target trigger operation on a target prop of the first virtual object;

the determining movement information of the first virtual object based on a third pose of the target virtual object and the first pose comprises:

determining movement information of the first virtual object based on a third pose of the target virtual object, the first pose and the corresponding range of action of the target prop.

18. The medium according to claim 17, wherein the movement information includes a movement distance and a steering angle, wherein the steering angle is an angle at which the first virtual object needs to be deflected toward the target virtual object, the third pose comprises a third position, and the first pose comprises a first position;

the determining movement information of the first virtual object based on a third pose of the target virtual object, the first pose and the corresponding range of action of the target prop comprises:

determining the movement direction based on the third position and the first position, and determining the steering angle based on the movement direction and the first orientation; and determining the movement distance based on the third position, the first position and the corresponding range of action of the target prop;

the controlling the first virtual object to make a movement according to the movement information comprises:

controlling the first virtual object to adjust the first orientation according to the steering angle and to make a movement according to the movement distance.

19. The medium according to claim 15, wherein, subsequent to controlling the first virtual object to perform an interactive action corresponding to the target trigger operation on the target virtual object, the method further comprises:

in the case where within a preset time period after the target trigger operation is responded it is not detected that a target trigger operation is performed again, or in the case where the state of the target virtual object satisfies a preset condition, reestablishing the linkage relationship between the first orientation and the second orientation.

20. The medium according to claim 15, wherein, subsequent to suspending the linkage relationship between a first orientation of the first pose and a second orientation of the second pose, the method further comprises:

in response to a movement control operation of the first virtual object, controlling the first virtual object to make a movement according to the movement control operation, and reestablishing the linkage relationship between the first orientation and the second orientation.

* * * * *